United States Patent
Papas et al.

(10) Patent No.: US 12,373,909 B2
(45) Date of Patent: Jul. 29, 2025

(54) ADAPTIVE SAMPLING USING DEEP LEARNING

(71) Applicant: Disney Enterprises, Inc., Burbank, CA (US)

(72) Inventors: Marios Papas, Opfikon (CH); Gerhard Röthlin, Horw (CH); Henrik D. Dahlberg, London (GB); Farnood Salehi, Zurich (CH); David M. Adler, Los Angeles, CA (US); Mark A. Meyer, Davis, CA (US); Andre C. Mazzone, Mill Valley, CA (US); Christopher R. Schroers, Uster (CH); Marco Manzi, Zurich (CH); Thijs Vogels, Lausanne (CH); Per H. Christensen, Seattle, WA (US)

(73) Assignee: Disney Enterprises, Inc., Burbank, CA (US)

(*) Notice: Subject to any disclaimer, the term of this patent is extended or adjusted under 35 U.S.C. 154(b) by 535 days.

(21) Appl. No.: 17/720,660

(22) Filed: Apr. 14, 2022

(65) Prior Publication Data
US 2023/0334612 A1    Oct. 19, 2023

(51) Int. Cl.
G06T 1/20    (2006.01)
G06N 3/08    (2023.01)
G06T 5/70    (2024.01)

(52) U.S. Cl.
CPC ............... *G06T 1/20* (2013.01); *G06N 3/08* (2013.01); *G06T 5/70* (2024.01); *G06T 2207/20081* (2013.01); *G06T 2207/20084* (2013.01)

(58) Field of Classification Search
CPC ... G06T 1/20; G06T 5/70; G06T 2207/20081; G06T 2207/20084; G06T 5/60; G06N 3/08; G06N 3/096; G06N 3/0464; G06N 3/045
See application file for complete search history.

(56) References Cited

U.S. PATENT DOCUMENTS

2020/0184313 A1* 6/2020 Vogels ..................... G06T 5/50
2020/0380763 A1* 12/2020 Abramov ............... G06N 3/045

OTHER PUBLICATIONS

Thijs Vogels, Fabrice Rousselle, Brian McWilliams, Gerhard Röthlin, Alex Harvill, David Adler, Mark Meyer, and Jan Novák. 2018. Denoising with Kernel Prediction and Asymmetric Loss Functions. ACM Transactions on Graphics (Proceedings of SIGGRAPH 2018) 37, 4, Article 124 (2018), 124:1-124:15 pages. [Abstract Only].
(Continued)

*Primary Examiner* — Oneal R Mistry
*Assistant Examiner* — Justin Philip Cascais
(74) *Attorney, Agent, or Firm* — Patterson + Sheridan, LLP

(57) ABSTRACT

Certain aspects of the present disclosure provide techniques for adaptive sampling for rendering using deep learning. This includes receiving, at a sampler in a rendering pipeline, a plurality of rendered pixel data, wherein the sampler includes a first machine learning (ML) model. It further includes generating a sampling map for the rendering pipeline using the first ML model and the plurality of rendered pixel data, including predicting a plurality of pixel values in the sampling map based on a generated distribution of pixel values. It further includes rendering an image using the sampler, the sampling map, and a denoiser in the rendering pipeline.

18 Claims, 9 Drawing Sheets

(56) References Cited

OTHER PUBLICATIONS

Alexandr Kuznetsov, Nima Khademi Kalantari, and Ravi Ramamoorthi. 2018. Deep Adaptive Sampling for Low Sample Count Rendering. Computer Graphics Forum 37 (Jul. 2018), 35-44. [Abstract Only].
Jon Hasselgren, Jacob Munkberg, Marco Salvi, Anjul Patney, and Aaron Lefohn. 2020. Neural Temporal Adaptive Sampling and Denoising. Computer Graphics Forum (2020). [Abstract Only].
Tiange Xiang, Hongliang Yuan, Haozhi Huang, and Yujin Shi. 2021. Two-Stage Monte Carlo Denoising with Adaptive Sampling and Kernel Pool.
Marios Papas, Gerhard Rothlin, Henrik Dahlberg, Farnood Salehi, David Adler, Mark Meyer, Andre Mazzone, Christoper Schroers, Marco Manzi, Thijs Vogels, Per Christensen, 2022. Deep Adaptive Sampling with Analytic Noise Distribution Synthesis. ACM Trans. Graph. 1, 1 (Jan. 2022), 14 pages.

\* cited by examiner

ADAPTIVE SAMPLING USING DEEP LEARNING

BACKGROUND

Generating high-quality animated content with convincing lighting often relies on computationally expensive light transport simulations on computer clusters, commonly referred to as rendering. The light transport simulations during rendering can compute how light interacts with virtual content (e.g., created by artists). But the rendering process can take dozens, or hundreds, of CPU hours of computation time for a single frame of animation. Because many animated productions (e.g., animated feature-length movies or television shows) are made up of hundreds of thousands of frames, reducing the rendering cost per frame plays a significant role in reducing the production costs of movies that include rendered content.

For example, light transport simulation in existing renderers can be performed using Monte-Carlo simulation techniques. This can include repeatedly sampling random paths of light in a given scene reflected in an image, and computing how much light is transported through these paths to a specific pixel in the image. This computation can be performed independently for every pixel in the image, and the more such paths are sampled, the more accurate the color value of a pixel will be.

SUMMARY

Embodiments include a method. The method includes receiving at a sampler in a rendering pipeline a plurality of rendered pixel data, wherein the sampler includes a first machine learning (ML) model. The method further includes generating a sampling map for the rendering pipeline using the first ML model and the plurality of rendered pixel data. This includes predicting a plurality of pixel values in the sampling map based on a generated distribution of pixel values. The method further includes rendering an image using the sampler, the sampling map, and a denoiser in the rendering pipeline.

Embodiments further include a non-transitory computer-readable medium containing computer program code that, when executed by operation of one or more computer processors, performs operations. The operations include receiving at a sampler in a rendering pipeline a plurality of rendered pixel data, wherein the sampler includes a first machine learning (ML) model. The operations further include generating a sampling map for the rendering pipeline using the first ML model and the plurality of rendered pixel data. This includes predicting a plurality of pixel values in the sampling map based on a generated distribution of pixel values. The operations further include rendering an image using the sampler, the sampling map, and a denoiser in the rendering pipeline.

Embodiments further include a system. The system includes a computer processor and a memory having instructions stored thereon which, when executed on the computer processor, performs operations. The operations include receiving at a sampler in a rendering pipeline a plurality of rendered pixel data, wherein the sampler includes a first machine learning (ML) model. The operations further include generating a sampling map for the rendering pipeline using the first ML model and the plurality of rendered pixel data. This includes predicting a plurality of pixel values in the sampling map based on a generated distribution of pixel values. The operations further include rendering an image using the sampler, the sampling map, and a denoiser in the rendering pipeline.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
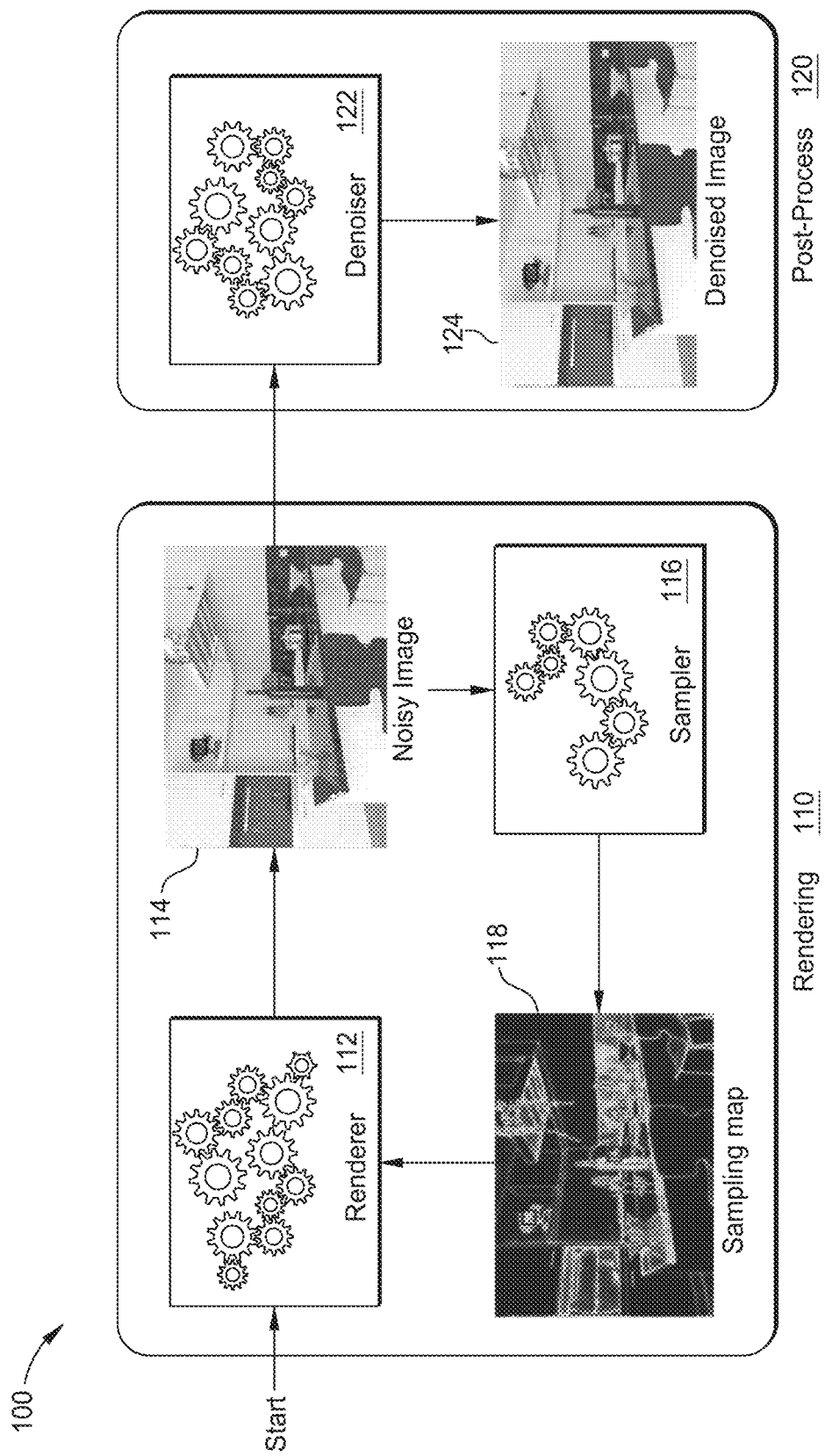
FIG. 1 illustrates a rendering pipeline for adaptive sampling for rendering using deep learning, according to one embodiment.

As discussed above, existing renderers perform light transport simulations by sampling random paths of light in a given scene reflected in an image, and computing how much light is transported through these paths to a specific pixel in the image. This is done for every pixel in a given image. But due to the varying complexity of the illumination and virtual content across an image, the number of samples required to achieve acceptable quality can differ significantly across pixels of a single frame. Thus, it is desirable for the renderer to achieve a specified level of quality, across all pixels in the image, as fast as possible.

In an embodiment, this can be achieved by adaptively distributing computation, and spending different amounts of computation on different pixels so that all pixels achieve similar quality. But this can result in unevenness in the rendered image, which is amplified by the use of post-processing denoising. For example, denoising can be used to generate production quality images from partially rendered frames (e.g., frames rendered using a low sampling rate). In an embodiment, denoising can be performed using suitable machine learning (ML) techniques (e.g., deep learning neural networks (DNNs)). The amount of noise (e.g., variance) reduction achieved by denoising, however, can differ significantly between frames and even within different pixels of the same frame.

Some existing rendering techniques aim to adaptively distribute samples in image regions based on predicted improvement in quality from further sampling. However, when predicting the final quality, these techniques fail account for the effects of denoising. Denoisers that rely on ML models (e.g., DNNs) can be used to keep rendering times in modern systems affordable, since they can produce high-quality renders at much lower sampling rates by leveraging information from neigh-boring pixels. This additional layer of processing should be factored into any adaptive-sampling scheme that relies on predicting output quality.

Current denoiser-aware adaptive sampling neural networks, compatible with ML model based denoisers, either provide sub-optimal sampling maps, such as in the case of direct error prediction (DEP), or do not scale to final-quality, high sample count scenarios, such as with the deep adaptive sampling and reconstruction approach (DASR). Each of these is described further below, with regard to FIG. 1.

In an embodiment, one or more techniques disclosed herein address the problem of adaptive sampling in the presence of denoisers amenable for production-quality rendering. One or more of these techniques can be used to yield improved results as compared to DEP, and competitive results to DASR using just a fraction of the training data.

In an embodiment, this can be achieved by using on-the-fly synthesis and sampling of plausible future renderings using per-pixel generated analytic distribution models that are highly efficient to sample from. This alleviates the need for storing explicit samples of the rendered distribution, such as in DASR, while providing strong results. These techniques are further described in the paper "Deep Adaptive Sampling with Analytical Noise Distribution Synthesis," incorporated herein by reference.

As noted one or more techniques disclosed herein have significant technical advantages. For example, one or more techniques can provide high quality results with significant savings in training time and data requirements, as compared to prior approaches (e.g., as compared to DASR). Further, one or more techniques can e trained on the same data as modern neural denoisers (e.g., without requiring the cascades used in DASR), which allows the reuse of legacy training datasets originally made for denoisers. Thus, making it an attractive solution for production environments, where the cost (e.g., in compute time, memory, and time) of creating new extensive datasets can be prohibitive FIG. 1 illustrates a rendering pipeline 100, according to one embodiment. In an embodiment, the rendering pipeline 100 illustrates adaptive sampling during rendering. The rendering pipeline 100 includes a rendering phase 110 and a post-process phase 120. In an embodiment, the rendering phase 110 can make rough estimates of relevant per-pixel statistics (e.g., mean and variance). For example, the rendering phase 110 can undertake an initial warm-up pass to gather these statistics.

The rendering phase 110 (e.g., the renderer 112, the sampler 116, or both) can use these initial statistics to generate a sampling map S (e.g., a sampling map 118). In an embodiment, the sampling map S includes an entry for every pixel index i, j from a set of pixel indices P in the image (e.g., the noisy image 114). Each entry $S_j$, $j \in S$ controls how many additional samples the renderer will distribute in the pixel i, j in the future.

In an embodiment, the rendering phase 110 performs adaptive sampling in multiple passes. During rendering (e.g., at pre-determined intervals) the sampling map S (e.g., the sampling map 118) is recomputed based on updated statistics. For example, during each pass t, a predefined number of samples according to a user-defined sample budget B is distributed over the entire image (e.g., the noisy image 114) according to the current sampling map 118. While doing so the pixel statistics of the image are updated and used to compute a new sampling map 118 for the next pass of the rendering phase 110. Each of these passes can be referred to as rendering iterations, or simply iterations.

In an embodiment, the sampler 116 and the denoiser 122 include a machine learning (ML) model. For example, the sampler 116 and denoiser 122 can each use a deep learning neural network (DNN) to predict the residual error of an image and generate a sampling map 118. This is discussed further below with regard to FIGS. 2-8.

As discussed above, a limited number of existing techniques can be used to optimize the error of noisy renderings (e.g., the noisy image 114) after denoising. For example, DEP can be used to predict the residual error of a denoised image, and distribute samples proportional to that predicted error. In a first step, DEP learns to predict the remaining error after denoising by training on pairs of denoised images and their corresponding denoising error. In a second step, DEP obtains sampling maps (e.g., sampling map 118) by normalizing the predicted error image and re-scaling it to obtain a desired sampling budget. DEP assumes that the future error reduction at each pixel is proportional to its current denoising error.

But sampling according to this heuristic can lead to sub-optimal solutions. In particular, it does not account for how future samples within a neighborhood of a pixel will affect its future denoising error. For example, DEP only considers the current residual error. It ignores how much a pixel's residual error is expected to change as more samples are added to it. This is because DEP's loss function (e.g., for the ML model) assumes that image regions with a higher error usually benefit more from new samples, as compared to regions with a lower error.

This is sometimes correct, but it ignores the dynamics of the relationship between the noisy input rendering (e.g., the noisy image 114), the denoiser (e.g., the denoiser 122), and the loss function (e.g., for the ML model). In particular, DEP ignores that adding samples to a particular pixel will typically improve the quality of the entire neighborhood region near the particular pixel, due to denoising. This can be amplified when using losses that consider larger pixel patches. Further, DEP ignores the behavior of the denoiser (e.g., the denoiser 122) itself and the denoising error change as more samples are allocated. This can make the predicted sampling map (e.g., the sampling map 118) suboptimal, particularly where the behavior of the denoiser (e.g., the denoiser 122) changes quickly, such as low sample count environments.

As another example, DASR can be used to optimize the error of noisy renderings (e.g., the noisy image 114) after denoising. DASR simultaneously trains a sampler (e.g., the sampler 116) and a denoising network (e.g., the denoiser 122) in an end-to-end fashion. Given rendered noisy input, the sampler produces a sampling map (e.g., the sampling map 118) used to construct a noisy image that is then denoised and compared against a ground truth. DASR circumvents the need to include a renderer in the training loop by composing future renderings from pre-computed data. To do so, they generate sample count cascades of powers of two for every training example. This allows efficient composition of plausible renderings with desired sample counts While DASR can produce higher quality sampling maps than DEP, it requires significantly more data to train. This data requirement becomes the primary bottleneck during training due to excessive I/O disk usage and limited GPU memory. DASR typically targets a low sample count regime, and these issues are amplified at high sample counts encountered in production rendering. For example, DASR can require roughly four times as long to train as DEP.

In an embodiment, one or more techniques disclosed below in relation to FIGS. 2-8 can provide similar (or improved) quality sampling maps compared to DASR, without the need to store and load cascades of images with different sample counts to compose future renderings. Instead, one or more of these techniques uses a generated analytic noise distribution to synthesize renderings on the fly. In an embodiment, this is significantly faster to train, while also providing high quality results and requiring a fraction of the training data to achieve competitive quality.

Figure 2:
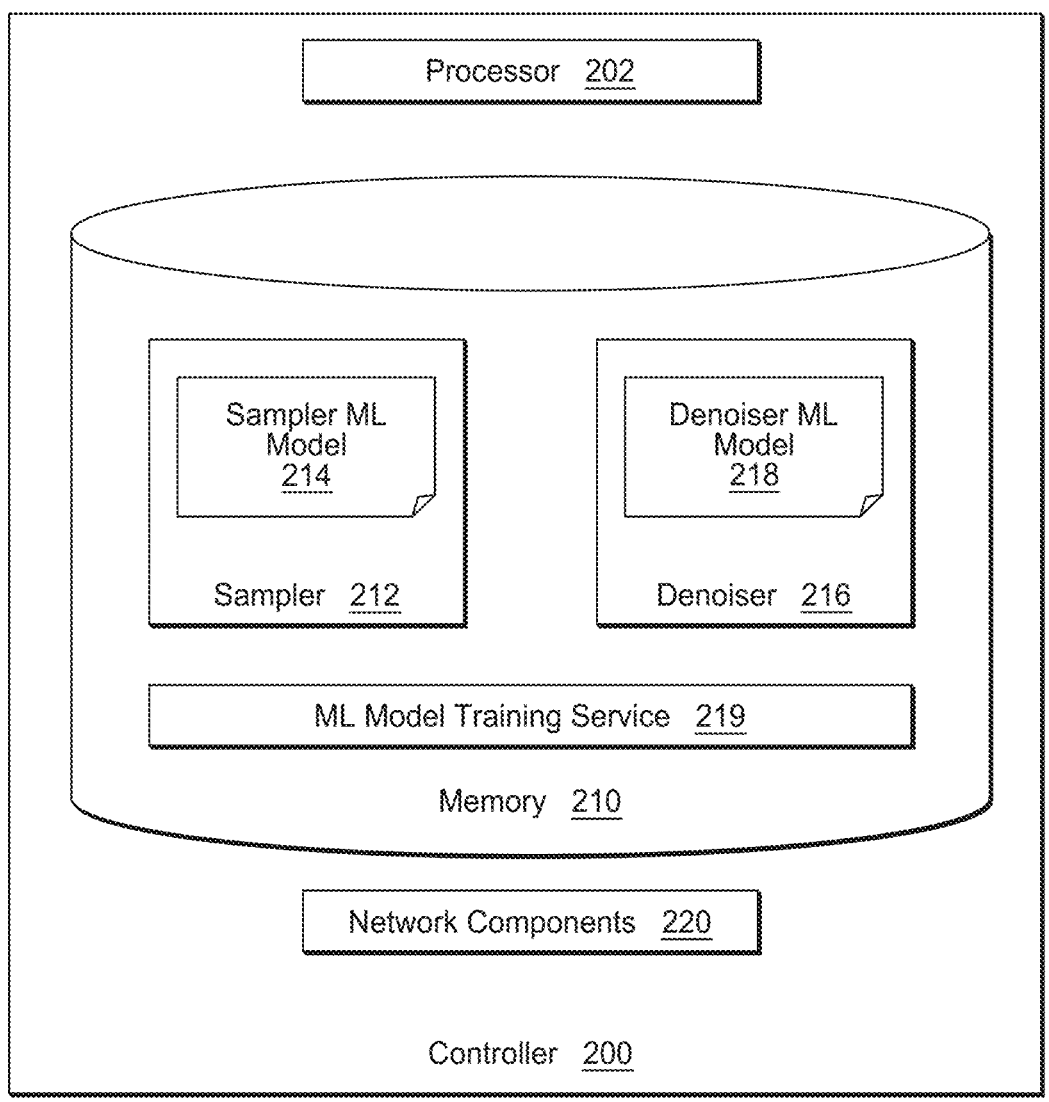
FIG. 2 is a block diagram illustrating a controller for adaptive sampling for rendering using deep learning, according to one embodiment.

FIG. 2 is a block diagram illustrating a controller 200 for adaptive sampling for rendering using deep learning, according to one embodiment. The controller 200 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the controller to interface with a suitable communication network (e.g., a communication network interconnecting various components of the rendering pipeline 100 illustrated in FIG. 1, or interconnecting the rendering pipeline 100 with other computing systems). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the controller 200. The program code is generally described as various functional "applications" or "modules" within the memory 210, although alternate implementations may have different functions and/or combinations of functions. Within the memory 210, the sampler 212 (e.g., the sampler 116) facilitates predicting a sampling map (e.g., the sampling map 118 illustrated in FIG. 1) as part of adaptive sampling for rendering using deep learning. The sampler 212 includes a sampler ML model 214 (e.g., a DNN). This is discussed further below with regard to FIGS. 3-8. The denoiser (e.g., the denoiser 122 illustrated in FIG. 1) facilitates denoising a noisy image (e.g., the noisy image 114) generated using a sampling map generated using the sampler. The denoiser 216 includes a denoiser ML model 218 (e.g., a DNN). This is discussed further below with regard to FIGS. 3-8. The ML model training service 219 facilitates training ML models (e.g., the sampler ML model 214 and the denoiser ML model 218). This is discussed further below, with regard to FIG. 8.

In an embodiment, the controller 200 can be used to implement some, or all, of a sampler 116 and denoiser 122 illustrated in FIG. 1, along with other components of the rendering pipeline 100. While the controller 200 is illustrated as a single entity, in an embodiment, the various components can be implemented using any suitable combination of physical compute systems, cloud compute nodes and storage locations, or any other suitable implementation. For example, the controller 200 could be implemented using a server or cluster of servers. As another example, the controller 200 can be implemented using a combination of compute nodes and storage locations in a suitable cloud environment. For example, one or more of the components of the controller 200 can be implemented using a public cloud, a private cloud, a hybrid cloud, or any other suitable implementation. Further, the controller 200 may include one or more computing platforms, such as computer servers for example, which may be co-located, or may form an interactively linked but distributed system, such as a cloud-based system.

Although FIG. 2 depicts the sampler 212 and the denoiser 216, and the ML models 214 and 218, as being mutually co-located in memory 210, that representation is also merely provided as an illustration for clarity. More generally, the controller 200 may include one or more computing platforms, such as computer servers for example, which may be co-located, or may form an interactively linked but distributed system, such as a cloud-based system. As a result, processor 202 and memory 210 may correspond to distributed processor and memory resources within the rendering pipeline 100. Thus, it is to be understood that any, or all, of the sampler 212 and the denoiser 216, and the ML models 214 and 218, may be stored remotely from one another within the distributed memory resources of the rendering pipeline 100.

Figure 3:
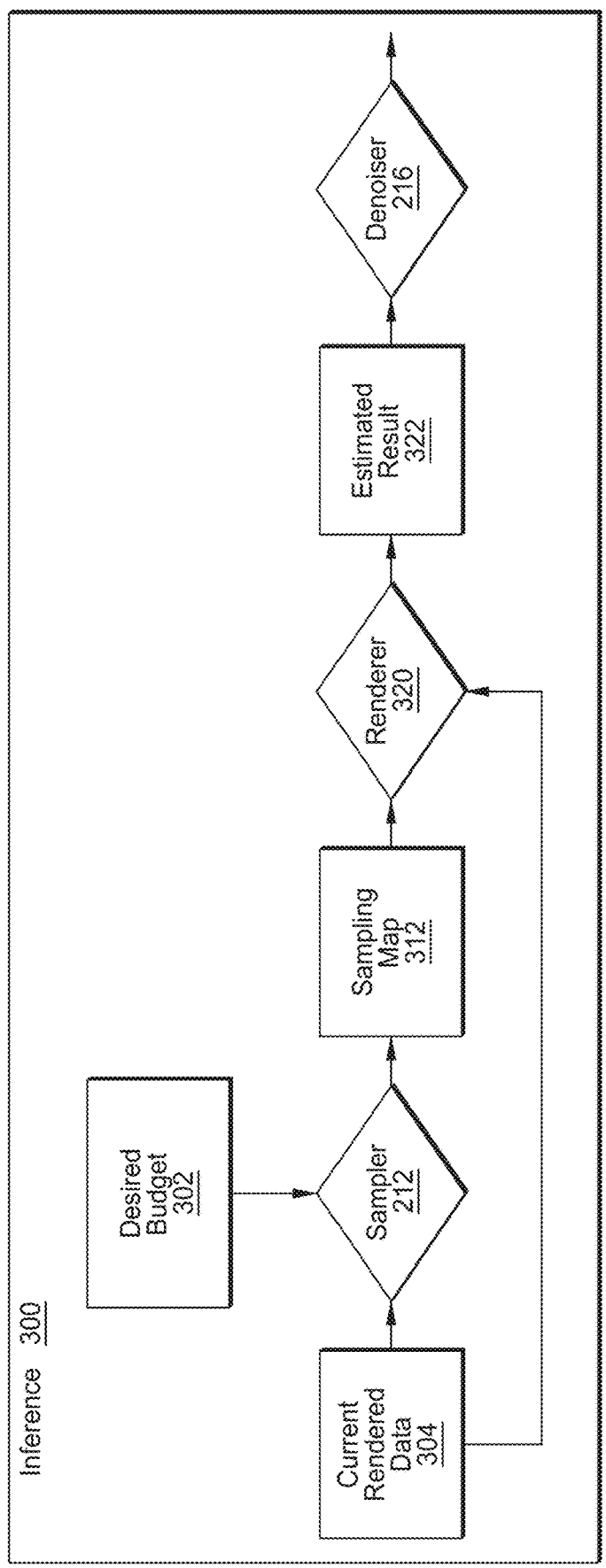
FIG. 3 is a flowchart illustrating an inference pipeline for adaptive sampling for rendering using deep learning, according to one embodiment.

FIG. 3 is a flowchart illustrating an inference pipeline 300 for adaptive sampling for rendering using deep learning, according to one embodiment. A sampler 212 receives a desired budget 302 and current rendered data 304. The sampler 212 generates one or more sampling maps 312 (e.g., the sampling map 118 illustrated in FIG. 1), which are used by a renderer 320 (e.g. the renderer 112 illustrated in FIG. 1) to generate an estimated result 322 (e.g., the noisy image 114 illustrated in FIG. 1). A denoiser 216 (e.g., the denoiser 122 illustrated in FIG. 1) processes the estimated result 322 to generate a result (e.g., a denoised image 124 illustrated in FIG. 1).

In an embodiment, the sampler 212 has been trained to minimize loss for an output of a denoiser 216, to produce a high quality rendered image. For example, the sampler 212 can include a suitable ML model (e.g., the sampler ML model 214 illustrated in FIG. 2). As discussed further below with regard to FIGS. 7-8, the sampler ML model can be trained to generate a sampling map that results in a high quality rendered image output by the denoiser 216.

In an embodiment, the desired budget 302 is a desired overall sampling budget for the next iteration of the rendering pipeline. In an embodiment, the desired overall sampling budget is defined by a user. It can be referred to as B and can be defined using the equation: $B = \Sigma_{t=0}^{T} B_t = \Sigma_{t=0}^{T} \Sigma_{p \in P} S_p(t)$, where $S_p(t)$ is the number of samples deployed at pixel p at iteration t. In an embodiment, the desired budget 302 can be represented as $B_{t+1}$ because it is the desired overall sampling budget for the next iteration of the rendering pipeline.

Optimizing the sampling distribution during rendering can be done using a multi-pass approach, where the sampling map is iteratively updated based on the data rendered so far. In a first pass, a small fraction of the total sample budget is distributed uniformly, yielding initial render data. At iteration t the optimal sampling map for the next iteration can be defined using the equation: $S_{t+i}(X_t, B_{t+1}) = \text{argmin} E_{Y \sim R(Y|S_t^X, t)}[L(D(Y), X_g)]$ subject to $\Sigma_{p \notin P} S_p(t+1) = B_{t+1}$ and $S_p(t) \geq 0$, $\forall p \in P$. In this equation $R(Y/S, X_t)$ is the distribution of rendered images given sampling map S and current render $X_t$. $X_g$ is the ground truth image, and L is a pixel based loss aggregated over the image.

In an embodiment, sampling from the distribution $R(Y/S, X_t)$ can also be written as $$Y = \frac{S'_t X_t + S Y'_S}{S'_t + S}.$$

In this equation, $Y'_S$ is an average of S samples from a renderer (e.g., identically and independently distributed (i.i.d) samples). $S'_t$ is the number of samples distributed up until iteration t. The expectation of the loss is computed over the distribution of rendering outputs in the next iteration, for a candidate sampling map S.

In an embodiment, a sampling map prediction is updated every time the sampling budget is doubled. This is merely an example. The update rate may be able to be significantly reduced (e.g., by a factor of 4 or 8) with minimal effect on the average denoising error.

Figure 4:
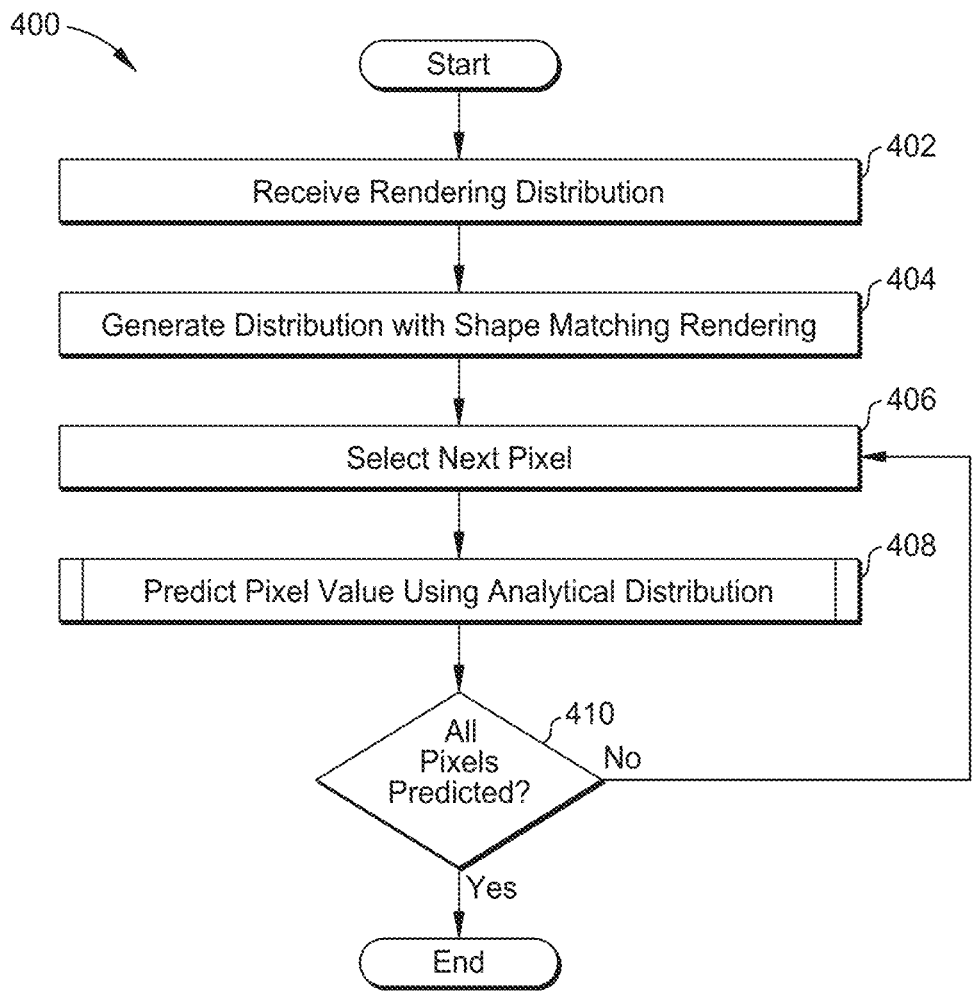
FIG. 4 is a flowchart illustrating predicting sampling map pixel values for rendering using deep learning, according to one embodiment.

FIG. 4 is a flowchart 400 illustrating predicting sampling map pixel values for rendering using deep learning, according to one embodiment. At block 402, a sampler (e.g., the sampler 212 illustrated in FIGS. 2-3) receives a rendering distribution. For example, the sampler can receive a noisy image generated by a renderer (e.g., the noisy image 114 generated by the renderer 112 illustrated in FIG. 1). The sampler can determine a rendering distribution for pixels in the image.

At block 404, the sampler generates a distribution (e.g., an analytical distribution) with a distribution shape matching the rendering distribution (e.g., a matching pixel mean and variance). As discussed above, the process of Monte Carlo rendering accumulates lighting information in a 3D scene by sampling the contribution of numerous light paths and aggregating them at the pixel level. In an embodiment, the noise distribution of rendered pixel mean values commonly resembles the shapes of a gamma distribution.

Thus, in an embodiment, the sampler can generate a gamma distribution as the analytical distribution. This is merely an example, and any suitable distribution could be used. For example, a Gaussian distribution, a log-normal distribution, a beta distribution, or any other suitable distribution. Further, the sampler can generate a distribution (e.g., a gamma distribution) with the same pixel mean and variance as the true rendered distribution. In an embodiment, the expected future denoising error for a sampling map generated using the true rendered distribution is equal to, or nearly equal to, the expected future denoising error for a sampling map generated using an analytical distribution in which the mean and variance match the true rendered distribution. This is also merely an example, and any suitable matching distribution shape could be used. For example, one or more of the pixel median, standard deviation, kurtosis, skewness, or any other suitable property could match.

For example, for a kernel-based denoiser with kernels that do not depend on future samples and where either mean squared error or mean relative squared error is used as the loss, the expected future denoising error for a sampling map generated using an analytical distribution in which the mean and variance match the true rendered distribution is equal to the expected future denoising error for a sampling map generated using the true rendered distribution. That is, applying these conditions, when samples are generated from any distribution with the same mean and variance as the true rendered distribution, the sampler recovers a loss with identical bias and variance. Further, where the loss is not mean squared error or mean relative squared error, the sample recovers a loss with approximately the same bias and variance.

The gamma distribution can be described using the equation $\Psi_\gamma(Y|X_t, S)$. To approximately sample the true rendered distribution, new samples for the gamma distribution can be generated using the equation $$\Psi_\gamma(Y|X_t, S) = \frac{S'_t X_t + S Y_\gamma(S)}{S'_t + S}.$$

In an embodiment, this describes combining each sample $Y_\gamma \sim \text{Gamma}(\alpha(S), \beta(S))$ with the current rendering data. In this example $\alpha(S)$ is a shape parameter and $\beta(S)$ is a rate parameter of the gamma distribution. These parameters can be computed as a function of new samples S, a ground truth value $X_g$ and a ground truth sample variance $V_{X_g}$. The combined distribution will have the same mean and variance as the rendered data when the gamma distribution has a ground truth value $X_g$ as its mean and a variance of $V_{X_g}/S$. Further, choosing a distribution with mean and variance that approximates, but does not match, the mean and variance of the rendering distribution results in high quality results.

At block 406 the sampler selects a next pixel. In an embodiment, the sampler generates a sampling map on a pixel by pixel basis. This is merely an example, and any suitable technique can be used (e.g., groups or regions of pixels could be used).

At block 408 the sampler predicts a pixel value for the sampling map using the analytical distribution. In an embodiment, the sampler samples from a distribution with the same mean and variance as the rendered pixel distribution (e.g., the analytical distribution generated at block 404). The expectation of the future rendered mean for the pixel at each data channel (e.g. color, surface normal, or albedo) after allocating S additional samples can be analytically computed using the sample. This is discussed further below, with regard to FIG. 5.

At block 410 the sampler determines whether all pixels have been predicted for the sampling map. If not, the flow returns to block 406 and the sampler selects the next pixel. If so, the flow ends.

Figure 5:
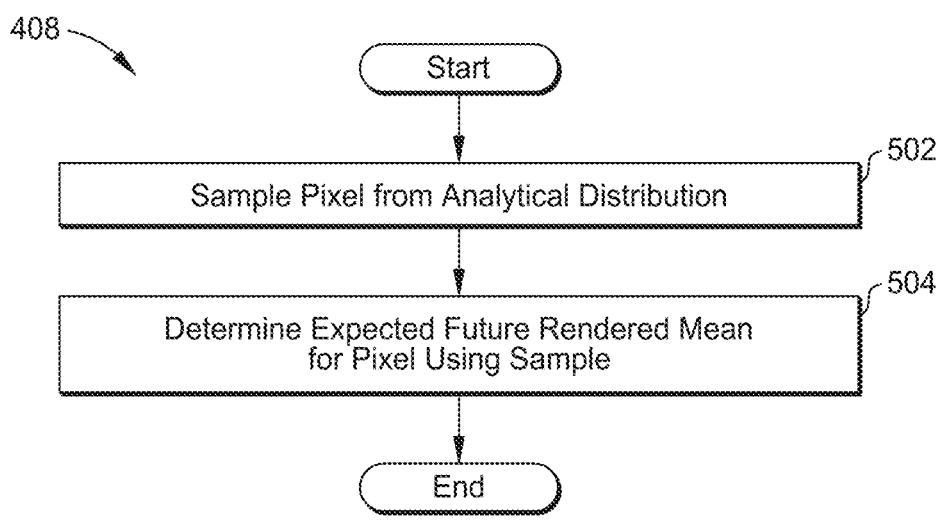
FIG. 5 is a flowchart further illustrating predicting pixel values for rendering using deep learning, according to one embodiment.

FIG. 5 is a flowchart further illustrating predicting pixel values for rendering using deep learning, according to one embodiment. In an embodiment, FIG. 5 corresponds with block 408 illustrated in FIG. 4. At block 502 a sampler (e.g., the sampler 212 illustrated in FIGS. 2-3) samples a pixel from an analytical distribution. As discussed above, in an embodiment the sampler receives an analytical distribution in which the values of the pixel mean and variance match the mean and variance of the true rendered distribution. This can be, for example, a gamma distribution with pixel mean and variance match the mean and variance of the true rendered distribution. The sampler samples a pixel from this distribution, corresponding to the pixel being predicted.

At block 504, the sampler determines an expected future rendered mean for the pixel using the sample. As discussed above in relation to block 406 illustrated in FIG. 4, the expectation of the future rendered mean for the pixel at each data channel (e.g. color, surface normal, albedo) after allocating S additional samples can be analytically computed using the sample. For example, it can be computed using the equation:

$$E[Y \sim R(Y|S, X_t)] = \frac{S'_t X_t + S X_g}{S'_t + S}.$$

In this equation $X_g$ is the ground truth, S is the number of new samples, S' is the currently allocated samples, and $X_t$ is the current data channel.

Figure 6:
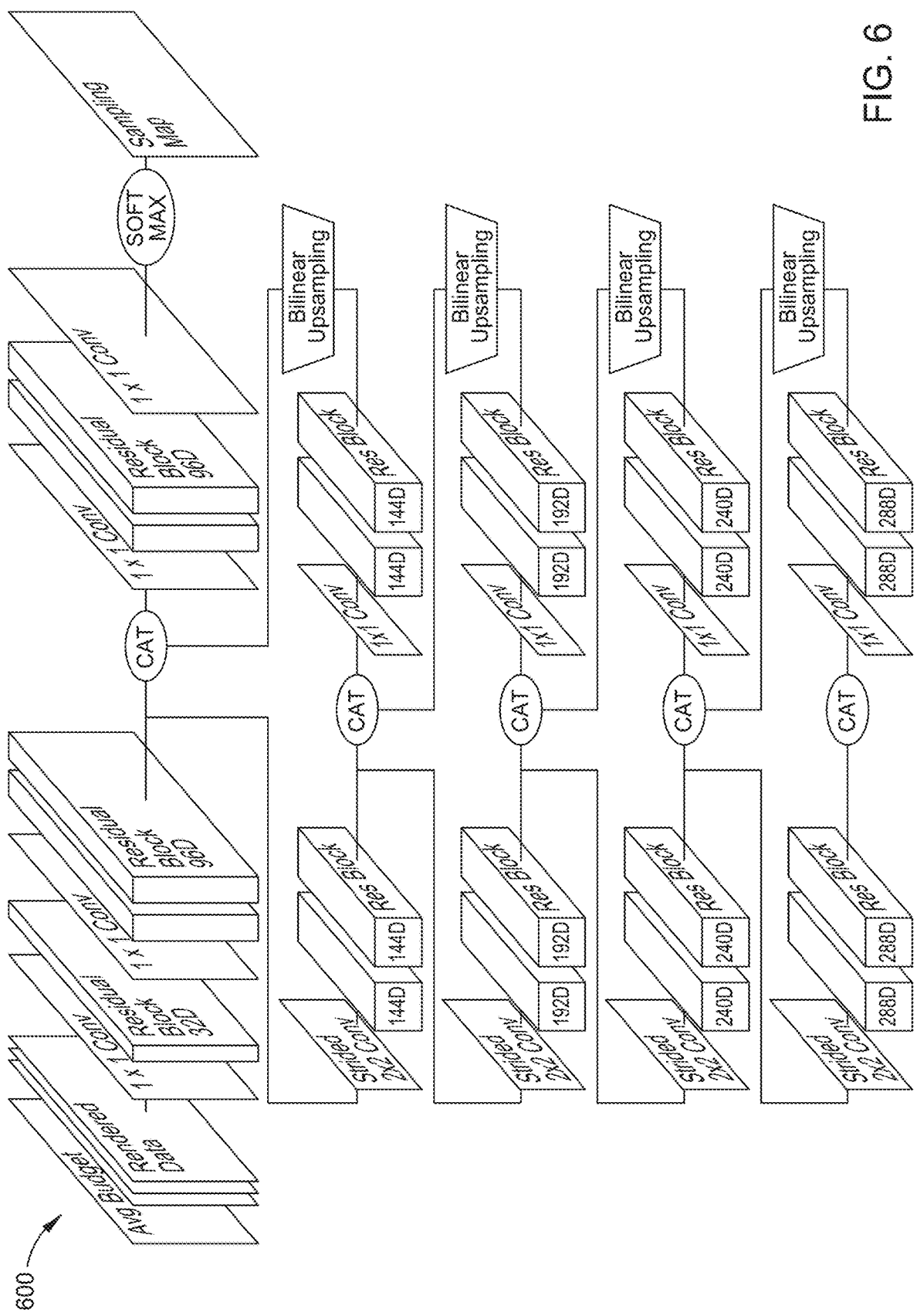
FIG. 6 is a schematic representation of a sampler network architecture for adaptive sampling for rendering using deep learning, according to one embodiment, according to one embodiment.

FIG. 6 is a schematic representation of a sampler network architecture for adaptive sampling for rendering using deep learning, according to one embodiment. In an embodiment the network 600 is a 5-scale U-net network architecture. The network receives as input rendered data and the desired sampling budget for the next iteration. The output is a scalar value per pixel that is soft-maxed and then multiplied by the desired total sampling budget. Each residual block includes two 3×3 convolutions each prefaced with a rectified linear unit (ReLU). The input to an embodiment of this network is first processed by a feature encoder: a 1×1 convolution and a residual block with a bandwidth of 32. In an embodiment, the residual blocks of each U-net scale can have a different bandwidth (e.g. 96, 144, 192, 240 and 288 and the coarsest scale). At each scale we name the first two residual blocks as the encoder and the last two (including the 1×1 convolution) as the decoder. The input of each scale is downscaled using a strided 2×2 convolution and then the output is upscaled and concatenated (CAT) with the output of the encoder of the finer scale and provided as input to that scale's decoder.

In an embodiment, FIG. 6 illustrates an example architecture for a sampler (e.g., for a sampler ML model 214 illustrated in FIG. 2). To produce a sampling map, the output of a sampler network $\Phi_\theta$ can be normalized using a softmax, and can be multiplied by an iteration budget B. This can be represented using the equation $S_\theta(X, B) = B \text{ softmax}(\Phi_\theta(X, B))$. Further, the inputs to the sampler can be represented using the equation [log (1+$I_s$), log (1+$I_d$), log (1+$F_a$), log (1+$S'_t$), log (1+B'), Fn] In this equation $I_s$ and $I_d$ are the specular and diffuse buffers of the color mean, $S'_t$ is the current accumulated sampling map, and B' is the desired average per-pixel sample budget. Further, the relative variance of the specular and diffuse mean buffers can be provided as input to the sampler. This informs the sampler about how many samples will be distributed on average over the image. This is merely an example, and any suitable architecture can be used for the sampler.

A denoiser (e.g., the denoiser 216 and the denoiser ML model 218 illustrated in FIG. 2) can be implemented using a two-pass kernel-predicting denoiser with a U-net architecture. The U-net is 5 scale, and the bandwidth of the convolutions at each scale starts from 64 and doubles at each coarser scale until it reaches 256. The color input to the denoiser can be the means of the diffuse or specular channel of the image, depending on the pass, the albedo and the surface normal. Both albedo and color can be log-transformed to limit the input range. This is merely an example, and any suitable architecture can be used for the denoiser.

Figure 7:
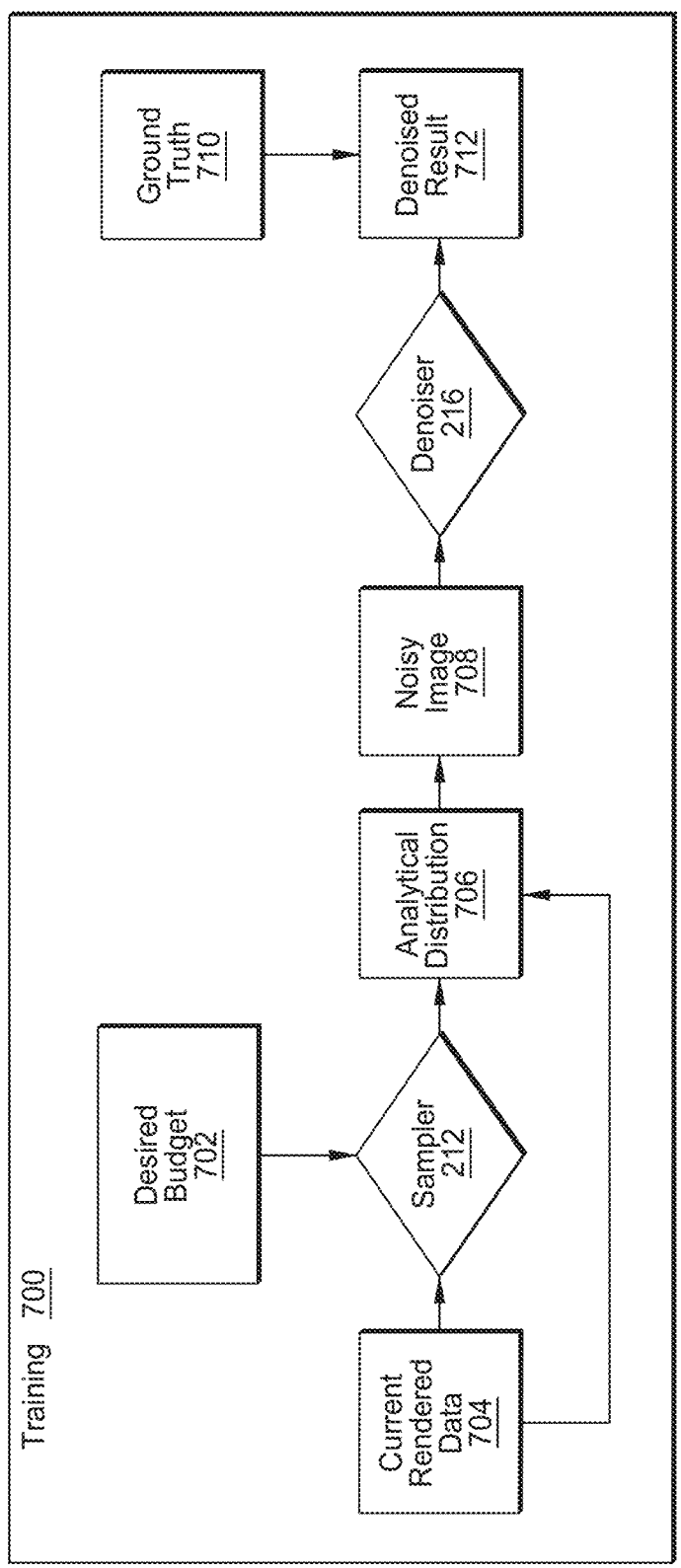
FIG. 7 is a flowchart illustrating an ML model training pipeline for adaptive sampling for rendering using deep learning, according to one embodiment.

FIG. 7 is a flowchart illustrating an ML model training pipeline 700 for adaptive sampling for rendering using deep learning, according to one embodiment. An analytic noise distribution 706 is used to generate a noisy image 708. This is used, along with a desired budget 702 and current rendered data 704, to train a sampler 212 and a denoiser 216. For example, they can be used to train a sampler ML model (e.g., the sampler ML model 214 illustrated in FIG. 2) and a denoiser ML model (e.g., the denoiser ML model 218 illustrated in FIG. 2) to minimize the loss of a denoised result 712, given a ground truth 710. This is discussed further below, with regard to FIG. 8.

Figure 8:
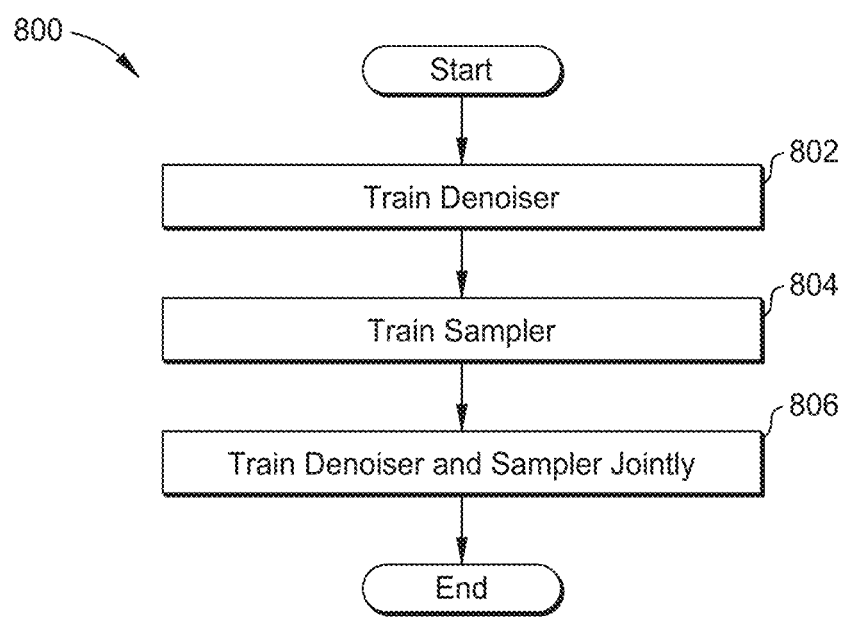
FIG. 8 is a flowchart illustrating training a sampler and a denoiser for adaptive sampling for rendering using deep learning, according to one embodiment.

FIG. 8 is a flowchart 800 illustrating training a sampler and a denoiser for adaptive sampling for rendering using deep learning, according to one embodiment. At block 802, an ML model training service (e.g., the ML model training service 219 illustrated in FIG. 2) trains a denoiser (e.g., the denoiser ML model 218 illustrated in FIG. 2). In an embodiment, the ML model training service trains the denoiser by extracting patches of 128×128 from each frame and using mini-batches of size 4. This is merely an example.

In an embodiment, the denoiser trained at block 802 is a fixed denoiser, for example a 5-scale kernel-based denoiser. As one example, the ML model training service trains the denoiser using a symmetric mean absolute percentage error (SMAPE) technique. The ML model training service uses an Adam optimizer (e.g., with 2 million iterations at a learning rate of 2×10$^{-5}$, followed by two fine-tuning phases of 250K iterations each with a learning rate reduction factor of 4. This is merely an example, and any suitable training technique and training parameters can be used.

At block 804, the ML model training service trains the sampler (e.g., the sampler ML model 214 illustrated in FIG. 2). In an embodiment, the ML model training service uses the fixed denoiser trained at block 802 to train the sampler. For example, the ML model training service can use the same training schedule used at block 802 to train the denoiser, but using more robust training loss (e.g., the training loss commonly used with DASR techniques). In an embodiment, a log transform can be used to suppress the range of colors. Alternatively, block 804 is optional and can be skipped.

In an embodiment, while training the sampler, the ML model training service can set the average per-pixel budget feature of the ML model to be the average number of samples distributed in the full frame. For example, assuming random sampling maps $S'_t$ are used in the data set, the average sample counts within a patch (e.g., a 128×128 patch of pixels) can differ significantly from the average sample-count of the entire image. Since the predicted values in the sampling map will always average to the value in the budget feature, the ML model training service can effectively train the network to be able to predict sampling maps with a large range of ratios between the next iteration budget and the current sample-count budget in the seen patch.

At block 806, the model training service trains the denoiser and sampler jointly. In an embodiment, this can share some characteristics with joint training used in DASR, but with significant differences. For example, the combined loss of an equation can be minimized, using a training set example of (X, Xg, B) (e.g., a tuple representing rendered data, ground truth, and desired sampling budget). The equation $E_{Y \sim \Psi(Y|S_\theta^{(X, B)}, X)}[L(D_\varphi(Y), X_g) + L(D_\varphi(X), X_g)]$ can be minimized using trainable parameters $\theta$ and $\varphi$. In an embodiment, the first term in this equation is an optimization goal for optimizing the denoiser D and sampler S jointly. The second term ensures that the denoiser performs well on real data. L is the mean of the log transform used to suppress the range of colors over all the image pixels.

As another example of differences between the training at block 806 and techniques used with DASR, during refinement the ML model training service can update the parameters of both the denoiser and sampler in ever iteration step. This differs from the alternating fashion typically used with DASR. The refinement phase can go on for 1M iterations. This is merely an example.

In an embodiment one or more techniques described herein implicitly assume that the variances of the pixel estimates go down linearly with the number of samples. While this is generally true of i.i.d samples, this may not be true when samples are drawn from low-discrepancy (LD) sequences. With LD sampling, the rate at which the variance goes down can be faster than linear and will typically be different for every pixel (and can even change as more samples as added). In an embodiment, one or more of the sampler or the denoiser (e.g., the sampler 212 and the denoiser 216 illustrated in FIG. 2) can be modified to handle LD sampling. For example, per-sample information relating to the convergence rate of each pixel could be stored. This could improve performance for LD sampling, but would require more data storage.

Figure 9:
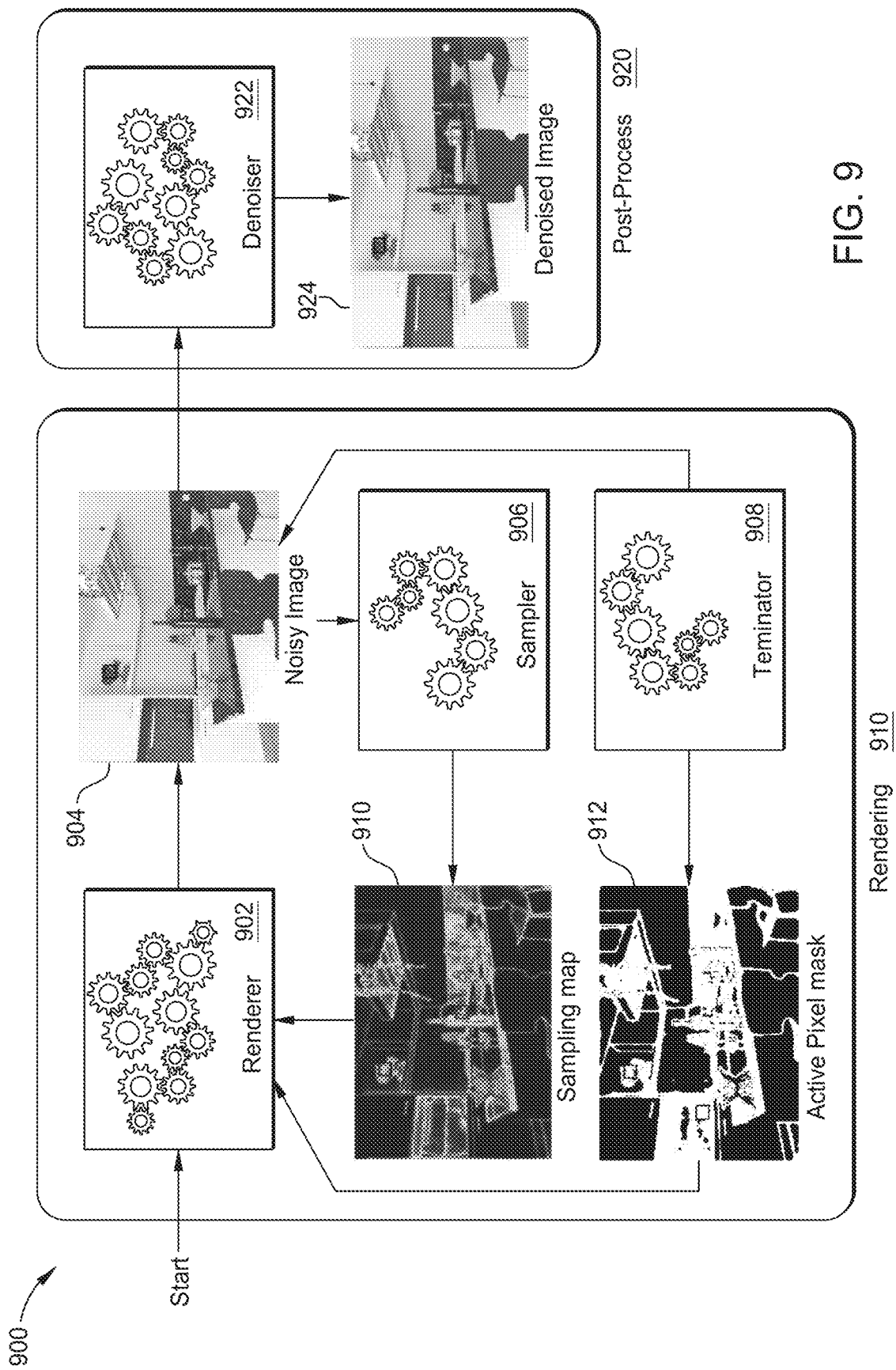
FIG. 9 illustrates a rendering pipeline for automatic rendering termination for rendering using deep learning, according to one embodiment.

FIG. 9 illustrates a rendering pipeline 900 for automatic rendering termination for rendering using deep learning, according to one embodiment. One or more techniques described above relate to improvements for adaptive sampling. In an embodiment, one or more of these techniques can further be applied for automatic rendering termination. For example, the goal of automatic rendering termination can be to reliably detect (during rendering) when a pixel is of high enough quality, such that the renderer can stop distributing additional computation in this pixel. Once a large percentage of pixels in the image is deemed to be of high enough quality the renderer can automatically exit the rendering process.

One way to implement automatic rendering termination is to use the un-normalized output of a DEP network, using the equation: err=$\Phi_\theta(X,D(x))$ and compare the individual per-pixel prediction err$_{i,j}$ to a user set quality threshold $\in$. As illustrated in FIG. 9, this can be combined with an adaptive sampler. At each rendering iteration, the adaptive sampler predicts a per-pixel sampling map that can be masked by the output of a rendering termination network (e.g., using the active pixel mask 912). To keep the iteration budget fixed, the rendering pipeline can re-distribute the sampling budget of terminated pixels. When the error of all (or most) pixels is below the threshold, then the rendering process can terminate.

In an embodiment the denoised image 924 is provided as input to the DEP network. Many denoisers, however, cannot be run on the fly during rendering (or running the denoisers on the fly incurs significant overhead). This can be improved by providing to the DEP network the concatenation of the noisy input image 904 and an auxiliary feature vector, during training and inference.

Further, automatic rendering termination can be unreliable, and could lead to premature termination of the renderer, which cannot be recovered. This is a particular concern when the estimated error underestimates the true residual error for a given pixel. This can be improved by applying simultaneous quantile regression (SQR).

SQR is a method to learn the aleatoric uncertainty of a prediction of a network that arises from ambiguity in the training data. In an embodiment, aleatoric uncertainty describes the conditional distribution of possible outputs of a network given a specific input. This can be used to predict the distribution of error values given an observed (noisy) input X. This distribution becomes more spread out (i.e. wider) when the input data X does not provide enough information to avoid ambiguity or when the network's capacity is insufficient to preserve enough aspects of the input data.

In an embodiment, knowledge of the conditional distribution allows one to identify situations q when the set of plausible error values is spread out and when an estimated error is thus not very trustworthy. This can be applied to automatic rendering termination by providing a desired quantile of error values to a network and optimizing the network with regard to pinball loss (e.g., instead of median loss). By varying the desired quantile during training, and adding the corresponding quantile during training, the network can be trained for all quantiles at once. Thus, applying SQR and quantile regression extends from merely predicting the 0.5-quantile (i.e., median) of an error value to allow a user to obtain any desired error quantile. Using SQR allows automatic rendering termination to be used for error predictions with a high likelihood erring on the side of overestimation, as opposed to underestimation.

As discussed above in relation to FIG. 1, the rendering pipeline 900 includes a rendering phase 910 and a post-process phase 920. In an embodiment, the rendering phase 910 can make rough estimates of relevant per-pixel statistics (e.g., mean and variance). For example, the rendering phase 910 can undertake an initial warm-up pass to gather these statistics. In an embodiment, the renderer 902 corresponds with the renderer 112 illustrated in FIG. 1, the sampler 906 corresponds with the sampler 116 illustrated in FIG. 1, and the denoiser 922 corresponds with the denoiser 122 illustrated in FIG. 1.

The rendering phase 910 (e.g., the renderer 902, the sampler 906, or both) can use these initial statistics to generate a sampling map S (e.g., a sampling map 910). In an embodiment, the sampling map S includes an entry for every pixel index i, j from a set of pixel indices P in the image (e.g., the noisy image 904). Each entry $S_{i,j} \in S$ controls how many additional samples the renderer will distribute in the pixel i, j in the future. In an embodiment, a terminator 908 generates an active pixel mask 912. The active pixel mask 912 illustrates when given pixels are ready for automatic termination. That is, the active pixel mask 912 illustrates when each pixel is of high enough quality, such that the renderer can stop distributing additional computation in this pixel. In an embodiment, the terminator 908 includes an ML model (e.g., a DNN). For example, as discussed above, the terminator 908 can include a DEP DNN.

Figure 10:
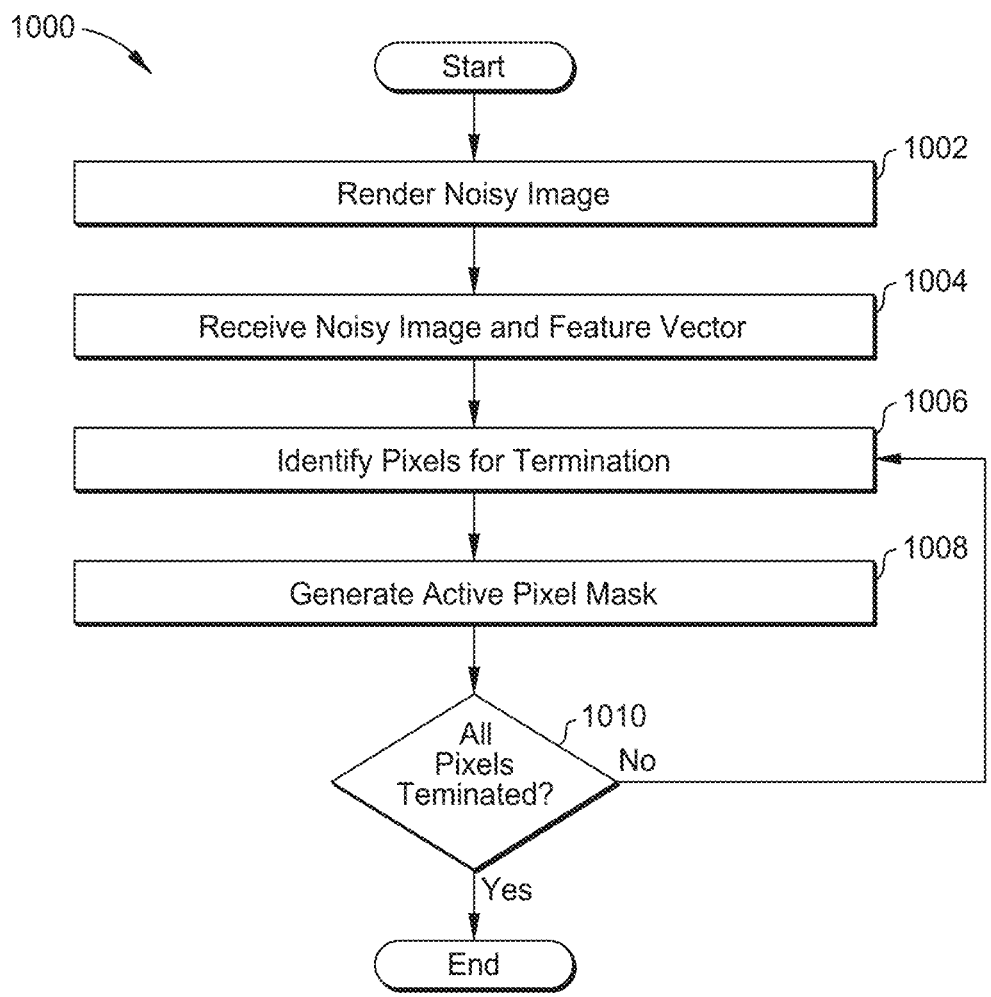
FIG. 10 is a flowchart for automatic rendering termination for rendering using deep learning, according to one embodiment.

FIG. 10 is a flowchart 1000 for automatic rendering termination for rendering using deep learning, according to one embodiment. At block 1002 a renderer (e.g., the renderer 902 illustrated in FIG. 9) renders a noisy image (e.g., the noisy image 904 illustrated in FIG. 9). At block 1004 a terminator (e.g., the terminator 906 illustrated in FIG. 9) receives a noisy image and a feature vector. In an embodiment, the terminator can be any suitable software service or aspect of a software service (e.g., implemented in the controller 200 illustrated in FIG. 2), and the feature vector can be any suitable feature vector to concatenate with the noisy image (e.g., as discussed above in relation to FIG. 9).

At block 1006, the terminator identifies pixels for termination. As discussed above in relation to FIG. 9, the terminator can identify pixels for termination by providing an ML model (e.g., a DEP DNN) the concatenation of the noisy input image and the auxiliary feature vector. Further, the terminator can use SQR to avoid estimated error that underestimates the true residual error for a given pixel, and to generate error predictions with a high likelihood of erring on the side of overestimation, as opposed to underestimation.

At block 1008, the terminator generates an active pixel mask (e.g., the active pixel mask 912 illustrated in FIG. 9). In an embodiment, the active pixel mask 912 reflects which pixels are ready for active termination, and which pixels still require additional computation. At block 1010, the renderer determines whether all pixels have been terminated. If not, the flow returns back to 1002 and rendering continues (e.g., without additional computation for the terminated pixels). If so, the flow ends.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving at a sampler in a rendering pipeline a plurality of rendered pixel data comprising a distribution of rendered pixels, wherein the sampler comprises a first machine learning (ML) model;
   generating a sampling map for the rendering pipeline using the first ML model and the plurality of rendered pixel data, comprising:
   generating an analytical distribution having a shape that matches a shape of the distribution of rendered pixel data; and
   predicting a plurality of pixel values in the sampling map based on the generated analytical distribution; and
   rendering an image using the sampler, the sampling map, and a denoiser in the rendering pipeline, wherein the sampling map is generated before rendering the image in the denoiser.

2. The method of claim 1, wherein the first ML model is trained to generate the sampling map to reduce remaining noise in the rendered image after denoising using the denoiser.

3. The method of claim 1, wherein the denoiser comprises a second ML model, and wherein the first and second ML models are trained jointly.

4. The method of claim 3,
   wherein the first and second ML models each comprise a deep learning neural network (DNN),
   wherein the first and second ML models are trained to generate the sampling map predicted to reduce remaining noise in the rendered image after denoising using the denoiser, and
   wherein the first ML model generates the sampling map further based on a desired sampling budget.

5. The method of claim 4, wherein training the first and second ML models comprises:
   training the second ML model using a plurality of training data;
   training the first ML model using the trained second ML model; and
   jointly refining the trained first ML model and the trained second ML model.

6. The method of claim 4, wherein training the first and second ML models comprises:
   training the second ML model using a plurality of training data; and
   jointly refining the trained second ML model and training the first ML Model.

7. The method of claim 1, further comprising:
   determining, automatically using a third ML model, that one or more pixels in the rendered pixel data are ready for rendering termination.

8. The method of claim 1, wherein the generated distribution is generated such that a first one or more properties of pixel values for the generated distribution matches a second one or more properties of pixel values relating to the rendered pixel data, and wherein the properties of pixel values comprise at least one of: (i) mean, (ii) variance, (iii) median, (iv) standard deviation, (v) kurtosis, or (vi) skewness values.

9. The method of claim 8, wherein the pixel values relate to at least one of: (i) color, (ii) surface normal, or (iii) albedo.

10. A non-transitory computer-readable medium containing computer program code that, when executed by operation of one or more computer processors, performs operations comprising:
    receiving at a sampler in a rendering pipeline a plurality of rendered pixel data comprising a distribution of rendered pixels, wherein the sampler comprises a first machine learning (ML) model;
    generating a sampling map for the rendering pipeline using the first ML model and the plurality of rendered pixel data, comprising:
    generating an analytical distribution having a shape that matches a shape of the distribution of rendered pixel data; and
    predicting a plurality of pixel values in the sampling map based on the generated analytical distribution; and
    rendering an image using the sampler, the sampling map, and a denoiser in the rendering pipeline, wherein the sampling map is generated before rendering the image in the denoiser.

11. The non-transitory computer-readable medium of claim 10, wherein the first ML model is trained to generate the sampling map to reduce remaining noise in the rendered image after denoising using the denoiser.

12. The non-transitory computer-readable medium of claim 10,
    wherein the denoiser comprises a second ML model,
    wherein the first and second ML models are trained jointly to generate the sampling map predicted to reduce remaining noise in the rendered image after denoising using the denoiser, and
    wherein the first ML model generates the sampling map further based on a desired sampling budget.

13. The non-transitory computer-readable medium of claim 10, wherein training the first and second ML models comprises:
    training the second ML model using a plurality of training data;
    training the first ML model using the trained second ML model; and
    jointly refining the trained first ML model and the trained second ML model.

14. The non-transitory computer-readable medium of claim 10, wherein the generated distribution is generated such that a first one or more properties of pixel values for the generated distribution matches a second one or more properties of pixel values relating to the rendered pixel data, and wherein the properties of pixel values comprise at least one of: (i) mean, (ii) variance, (iii) median, (iv) standard deviation, (v) kurtosis, or (vi) skewness values.

15. A system, comprising:
    a computer processor; and
    a memory having instructions stored thereon which, when executed on the computer processor, performs operations comprising:
    receiving at a sampler in a rendering pipeline a plurality of rendered pixel data comprising a distribution of rendered pixels, wherein the sampler comprises a first machine learning (ML) model;
    generating a sampling map for the rendering pipeline using the first ML model and the plurality of rendered pixel data, comprising:
    generating an analytical distribution having a shape that matches a shape of the distribution of rendered pixel data; and
    predicting a plurality of pixel values in the sampling map based on the generated analytical distribution; and
    rendering an image using the sampler, the sampling map, and a denoiser in the rendering pipeline, wherein the sampling map is generated before rendering the image in the denoiser.

16. The system of claim 15, wherein the first ML model is trained to generate the sampling map to reduce remaining noise in the rendered image after denoising using the denoiser.

17. The system of claim 15,
wherein the denoiser comprises a second ML model,
wherein the first and second ML models are trained jointly to generate the sampling map predicted to reduce remaining noise in the rendered image after denoising using the denoiser, and
wherein the first ML model generates the sampling map further based on a desired sampling budget.

18. The system of claim 15,
wherein the generated distribution comprises at least one of: (i) a gamma distribution, (ii) a Gaussian distribution, (iii) a log-normal distribution, or (iv) a beta distribution, and
wherein the generated distribution is generated such that a first one or more properties of pixel values for the generated distribution matches a second one or more properties of pixel values relating to the rendered pixel data, and wherein the properties of pixel values comprise at least one of: (i) mean, (ii) variance, (iii) median, (iv) standard deviation, (v) kurtosis, or (vi) skewness values.

* * * * *

UNITED STATES PATENT AND TRADEMARK OFFICE
CERTIFICATE OF CORRECTION

PATENT NO. : 12,373,909 B2
APPLICATION NO. : 17/720660
DATED : July 29, 2025
INVENTOR(S) : Marios Papas et al.

It is certified that error appears in the above-identified patent and that said Letters Patent is hereby corrected as shown below:

In the Specification

Under Column no. 4, Line no. 1, Replace:
"$S_i, j$"
With:
--$S_{i,j}$--

Under Column no. 7, Line no. 8, Replace:
"$\mathrm{argmin} E_{Y \sim R(Y|S_t, X_t)}[L(D(\bar{Y}), X_g)]$"
With:
--$argmin E_{Y \sim R(Y|S_t, X_t)}[L(D(Y), X_g)]$--

Under Column no. 7, Line no. 8, Replace:
"$\sum_{p \notin P} P^s_p(t+1) = B_{t+1}$"
With:
--$\sum_{p \notin P} P^s_p(t+1) = B_{t+1}$--

Under Column no. 9, Line no. 45, Replace:
"$\Phi_\theta$can"
With:
--$\Phi_\theta$ can--

Signed and Sealed this
Twenty-third Day of December, 2025

John A. Squires
*Director of the United States Patent and Trademark Office*

CERTIFICATE OF CORRECTION (continued)
U.S. Pat. No. 12,373,909 B2

Under Column no. 10, Line no. 65, Replace:

"$E_{Y\sim\Psi(Y|S_\theta^{(X,B),X)}}[L(D_\varphi(Y), X_g)$,"

With:

--$E_{Y\sim\Psi(Y|S_\theta(X,B),X)}[L(D_\varphi(Y), X_g)$--

Under Column no. 11, Line no. 43, Replace:

"$\epsilon.$"

With:

--$\epsilon.$--